United States Patent [19]

Johnson et al.

[11] Patent Number: 6,070,781
[45] Date of Patent: Jun. 6, 2000

[54] SYSTEM FOR BRINGING THE JOINT EDGES OF SHEET MATERIAL INTO BUTTING RELATIONSHIP FOR WELDING

[75] Inventors: Kenneth C. Johnson, Bloomingdale; Christopher A. Zurek, Crystal Lake, both of Ill.

[73] Assignee: Littell International, Inc., Addison, Ill.

[21] Appl. No.: 08/902,126

[22] Filed: Jul. 29, 1997

Related U.S. Application Data

[62] Division of application No. 08/554,372, Nov. 8, 1995, Pat. No. 5,814,786.

[51] Int. Cl.[7] ............................. B23K 1/14; B23K 37/00; B23K 5/22; B23Q 3/08
[52] U.S. Cl. ......................... 228/49.4; 228/5.5; 228/44.3; 228/212; 269/22; 219/121.63
[58] Field of Search .......................... 228/106, 5.5, 212, 228/44.3, 49.4; 269/43, 22; 29/281.5; 219/121, 121.63

[56] References Cited

U.S. PATENT DOCUMENTS

| | | |
|---|---|---|
| 1,773,068 | 8/1930 | Vienneau . |
| 2,852,660 | 9/1958 | Maloney . |
| 3,535,489 | 10/1970 | Hinrichs . |
| 3,819,166 | 6/1974 | Ellis et al. ............................. 267/64 R |
| 3,881,084 | 4/1975 | Baardsen . |
| 3,909,582 | 9/1975 | Bowen . |
| 4,000,392 | 12/1976 | Banas et al. . |
| 4,161,436 | 7/1979 | Gould . |
| 4,257,499 | 3/1981 | Deschner ............................. 188/287 |
| 4,315,132 | 2/1982 | Saurin et al. . |
| 4,377,735 | 3/1983 | Minamida et al. . |
| 4,417,125 | 11/1983 | Tsutsumi . |
| 4,626,651 | 12/1986 | Taniguchi et al. ................ 219/121 LC |
| 4,650,954 | 3/1987 | Frings et al. . |
| 4,733,815 | 3/1988 | Sturm . |
| 4,827,100 | 5/1989 | Frings et al. . |
| 4,831,230 | 5/1989 | Lemelson . |
| 4,872,940 | 10/1989 | Strum et al. . |
| 5,023,427 | 6/1991 | Neiheisel et al. . |
| 5,245,156 | 9/1993 | Kamogawa et al. . |
| 5,250,783 | 10/1993 | Nishi et al. . |
| 5,276,304 | 1/1994 | Sauvage et al. .................... 219/121.63 |
| 5,393,956 | 2/1995 | Guth et al. . |
| 5,439,157 | 8/1995 | Geier et al. . |
| 5,536,915 | 7/1996 | Peru et al. ........................ 219/121.63 |
| 5,711,628 | 1/1998 | Fletcher ...................................... 403/5 |

FOREIGN PATENT DOCUMENTS

| | | |
|---|---|---|
| 1276506 | 11/1990 | Canada . |
| 2062908 | 7/1995 | Canada . |
| 0098306 A1 | 1/1984 | European Pat. Off. . |
| 0117751 A2 | 9/1984 | European Pat. Off. . |
| 0279866 B1 | 3/1992 | European Pat. Off. . |
| 0531139 B1 | 8/1995 | European Pat. Off. . |
| 0543338 B1 | 8/1995 | European Pat. Off. . |

OTHER PUBLICATIONS

*High Speed Laser Welding of Deep Drawing Low Carbon Steel* By: G.L. Neiheisel; Research & Technology, Armco Inc., Middletown, OH 45042 USA.

(List continued on next page.)

*Primary Examiner*—Patrick Ryan
*Assistant Examiner*—Kiley Stoner
*Attorney, Agent, or Firm*—Richard G. Lione; Brinks Hofer Gilson & Lione

[57] ABSTRACT

A system for bringing the joint edges of first and second sheet metal components into butting relationship. The components are clamped in opposing clamping assemblies with one of the assemblies being movable toward and away from the other. A fluid motor is mounted on one clamping assembly and a piston extending therefrom is connected to the other clamping assembly through a pair of expandable bladders. By sequentially introducing high and low pressure air to first one bladder and then the other, the movable clamping assembly is caused to move one component toward the other while accommodating any initial misalignment between the edges.

14 Claims, 14 Drawing Sheets

OTHER PUBLICATIONS

*Production and Usage of Laser–Beam–Welded Sheet Metal* By: Albrecht J. Selige and Wilfried Prange Thyssen Stel Corp.; Thyssen Research Dept.; Duisburg, W. Germany.

Laser Welding, Machining and Materials Processing; Proceedings of the International Conference on Applications of Lasers and Electro–optics ICALEO '85 Edited by Professor C. Albright, Ohio State University, USA; San Francisco, CA, USA; IFS (Publications) Ltd., UK.

*Deep Drawing of Welded Blanks*; By: Katsuhiko Yasuda.

*Metals Handbooks*; 8th Edition vol. 4 Forming; prepared under the direction of the ASM Handbook Committee; American Society for Metals; Metale Park, Ohio.

High Speed Welding of Sheet Steel with $CO_2$ Laser; Welding Journal; By: E.L. Baardsen, D.J. Schmatz and R.E. Bisaro.

Machine Description and General Operations, $CO_2$ Laser Welder; Version International Group, Inc.

Machine Description and General Operation, Blank Transfer Conveyor; Version International Group, Inc.

Version International Group, Inc.; Drawing No. B–605391.
Version International Group, Inc.; Drawing No. B–605396.
Version International Group, Inc.; Drawing No. B–605397.
Version International Group, Inc.; Drawing No. B–605398.
Version International Group, Inc.; Drawing No. B–605785.
Version International Group, Inc.; Drawing No. B–601709.
Version International Group, Inc.; Drawing No. B–605787.
Version International Group, Inc.; Drawing No. D–606038.
Version International Group, Inc.; Drawing No. D–606040.
Version International Group, Inc.; Drawing No. D–606066.
Version International Group, Inc.; Drawing No. D–606067.
Version International Group, Inc.; Drawing No. D–606078.
Version International Group, Inc.; Drawing No. D–606126.

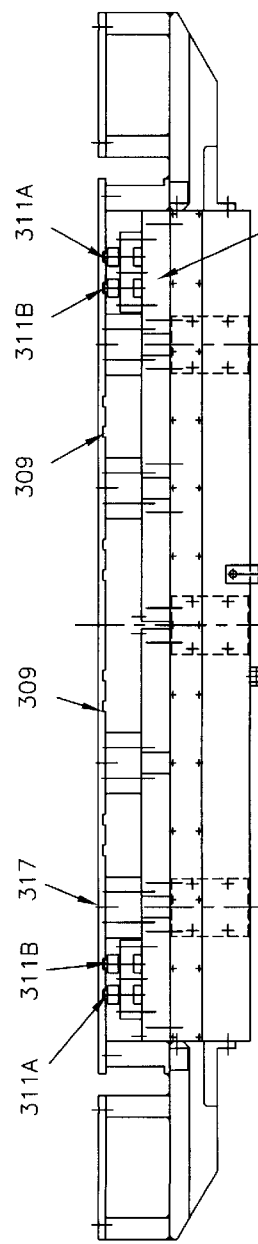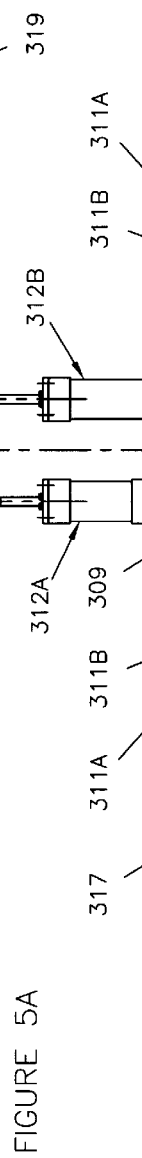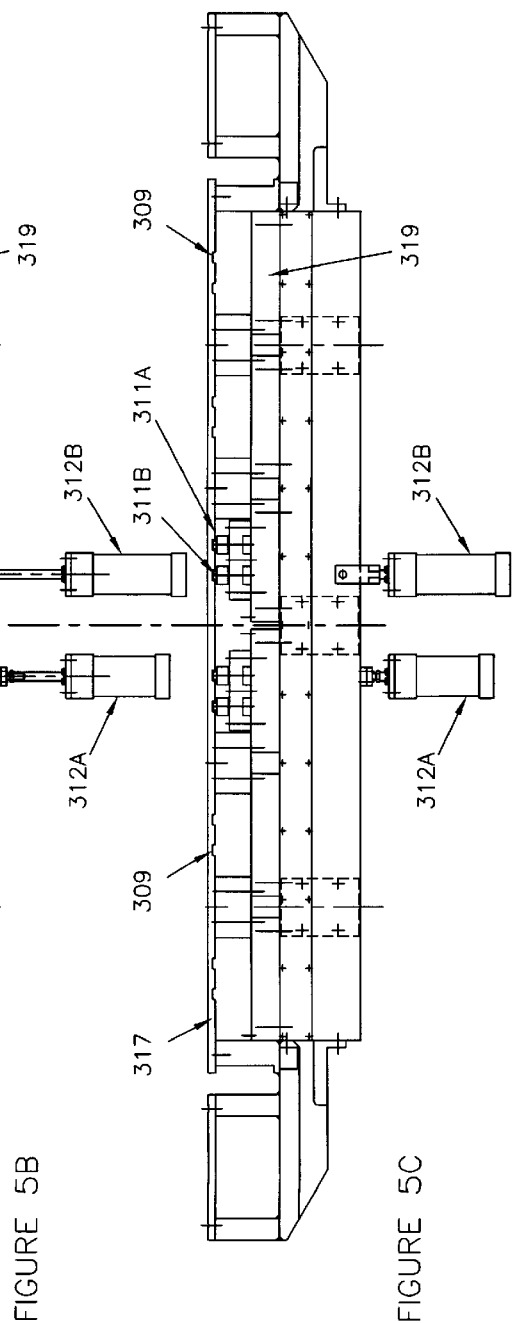
FIGURE 5A
FIGURE 5B
FIGURE 5C

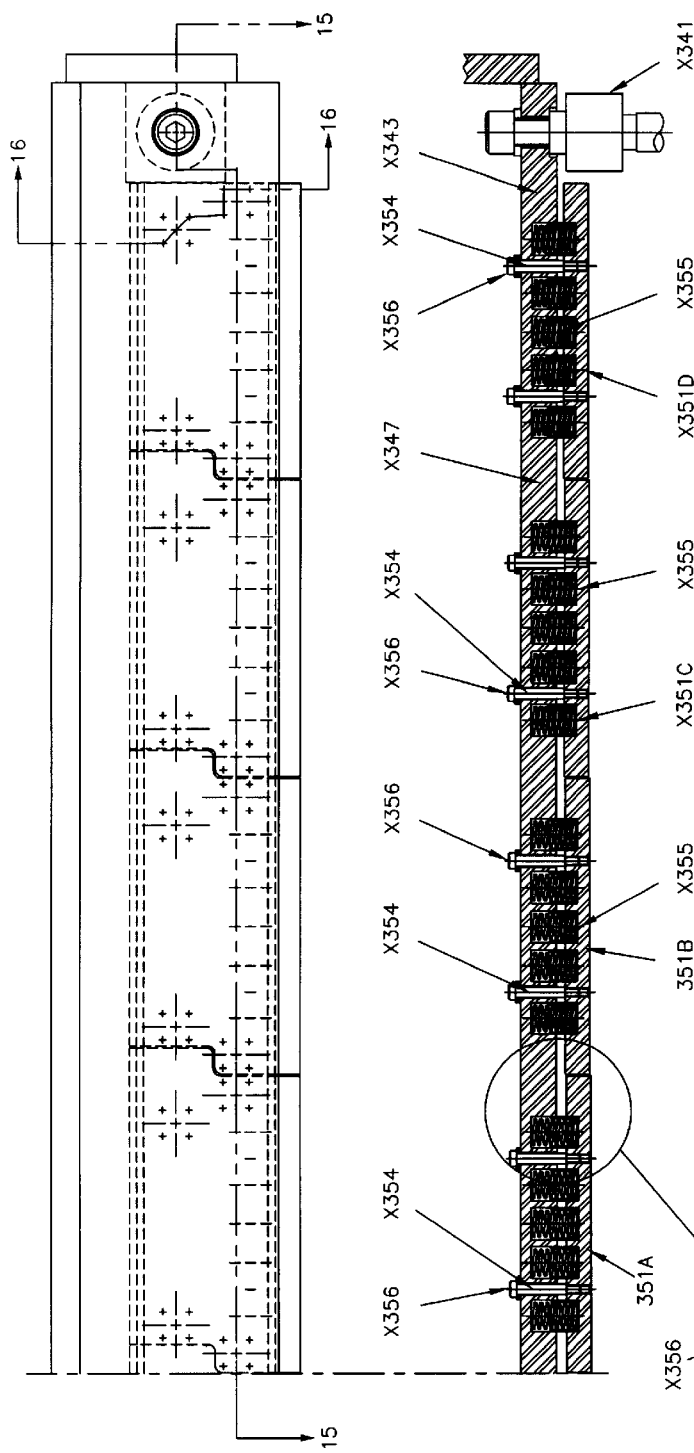
FIGURE 14
FIGURE 15
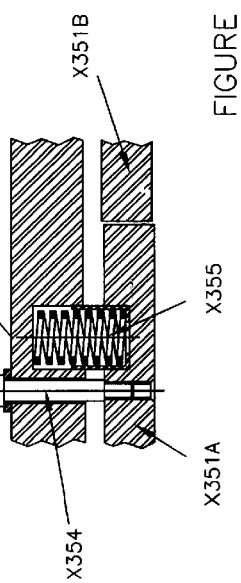
FIGURE 15A
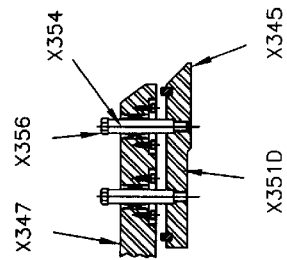
FIGURE 16

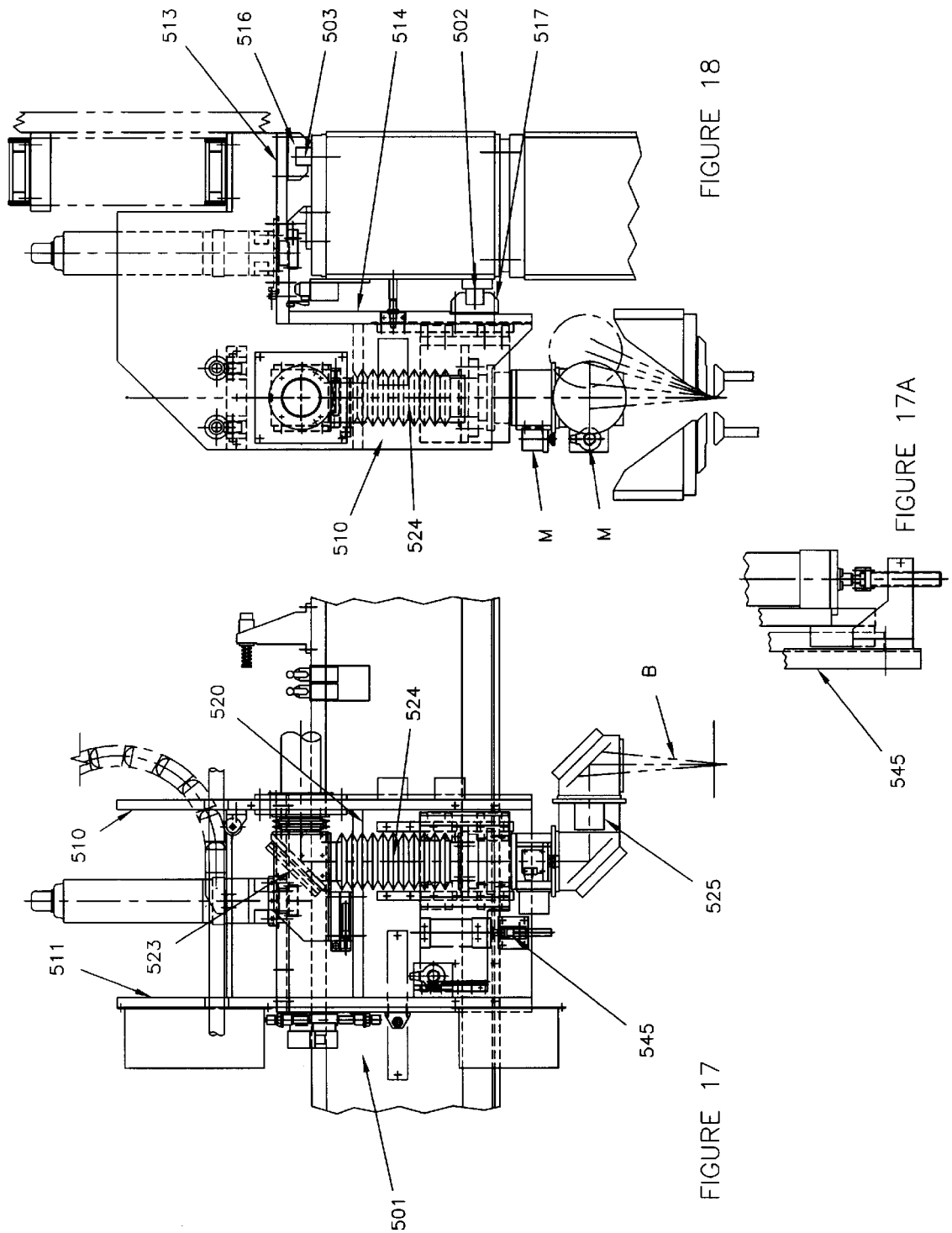

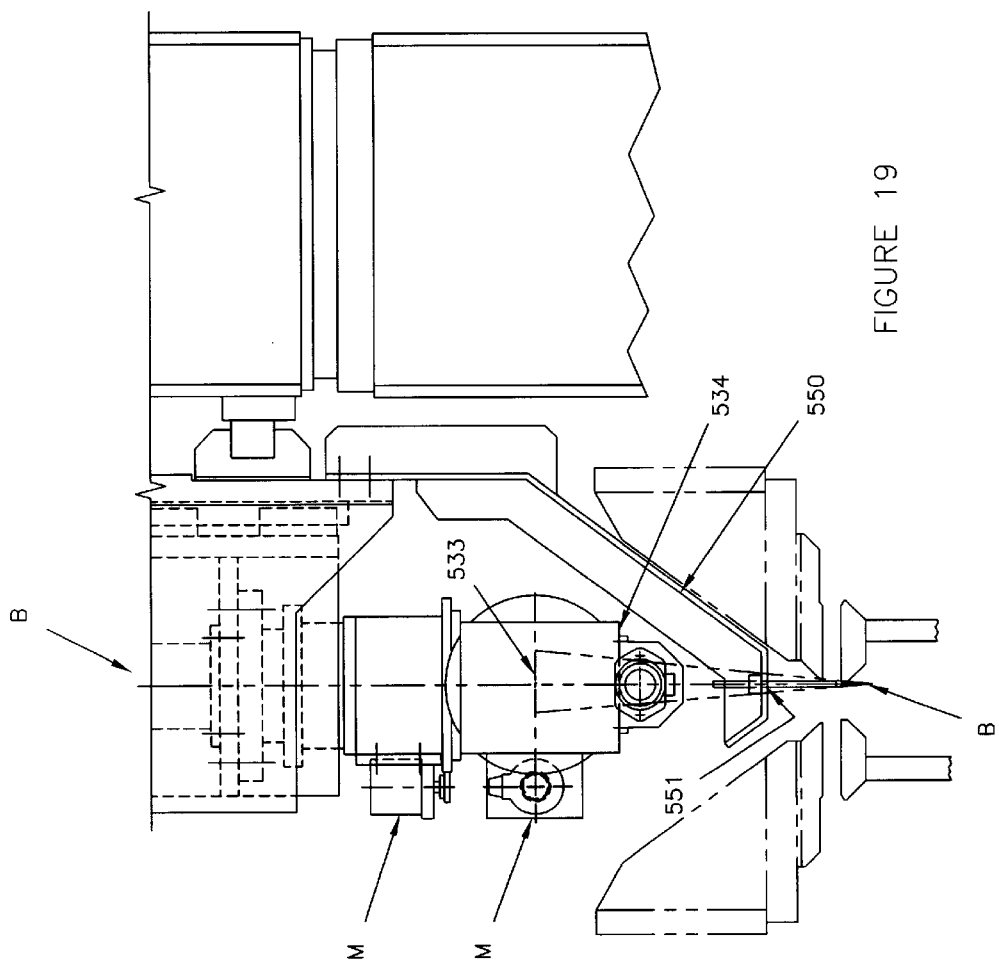
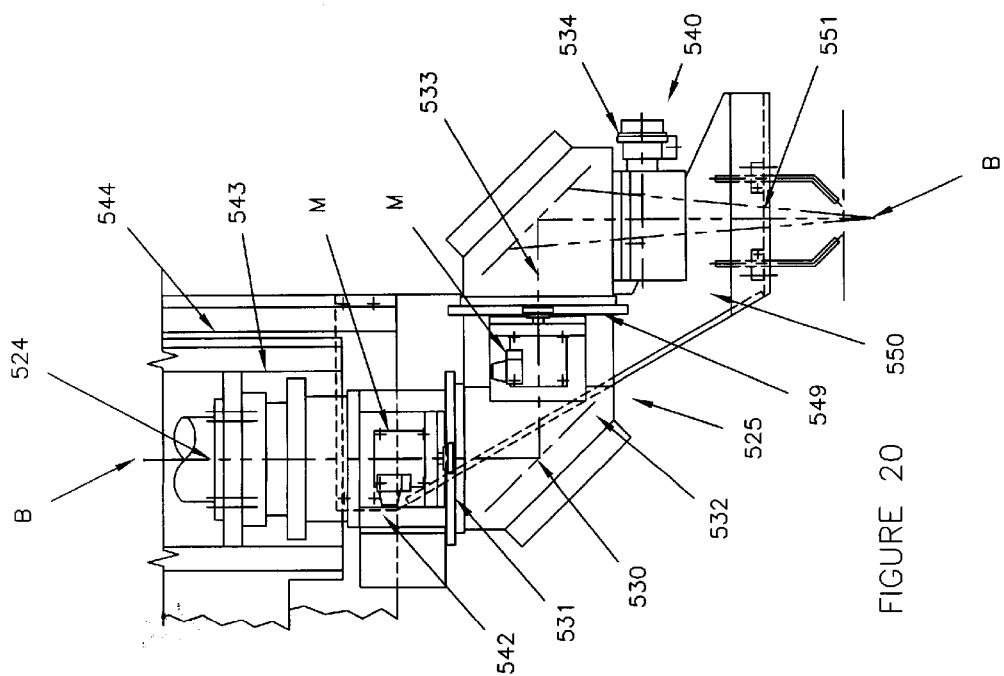

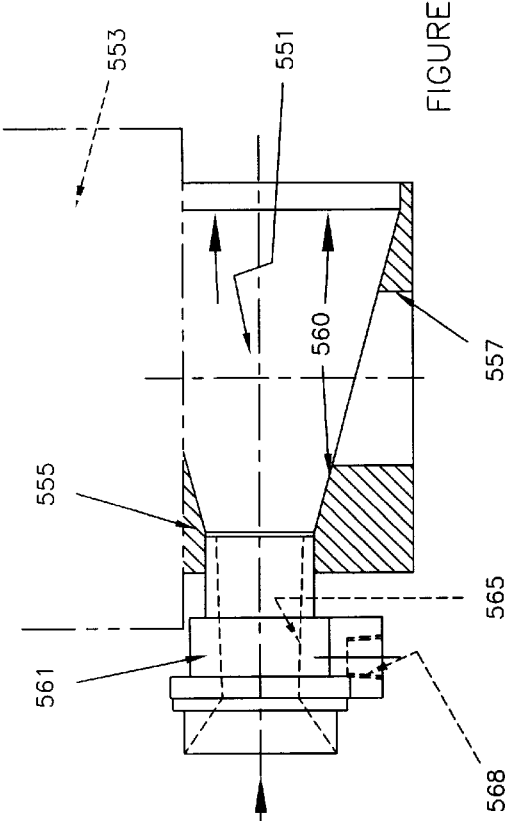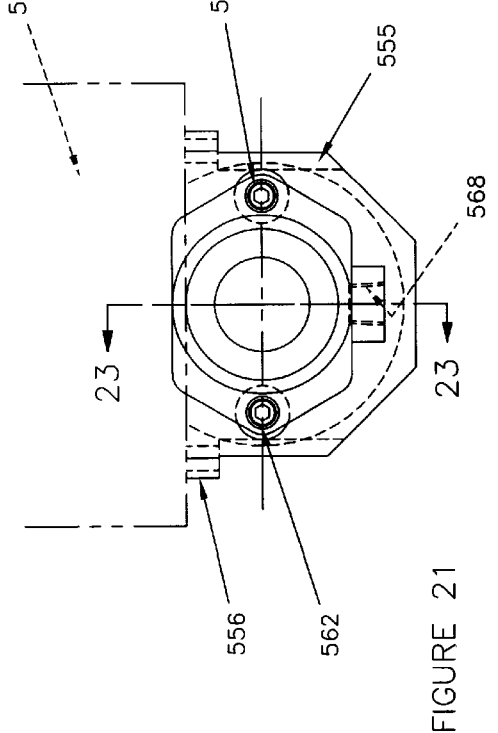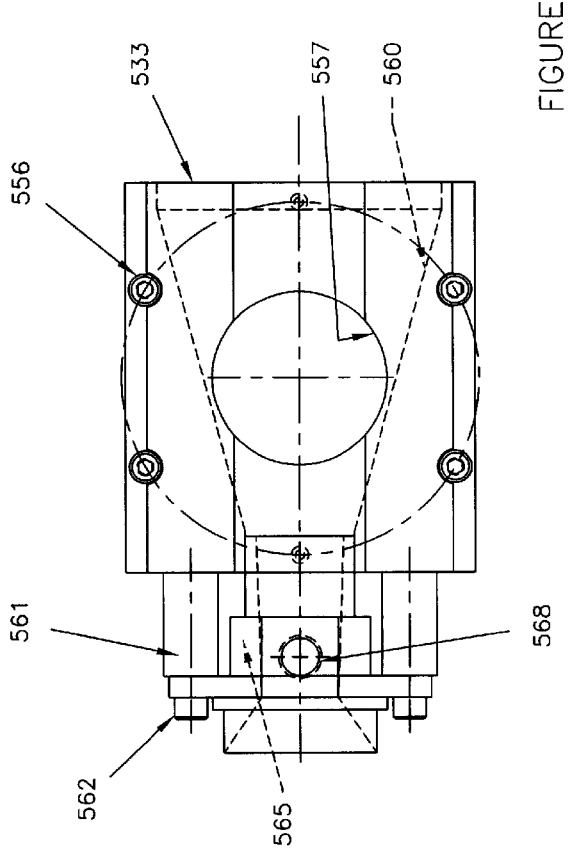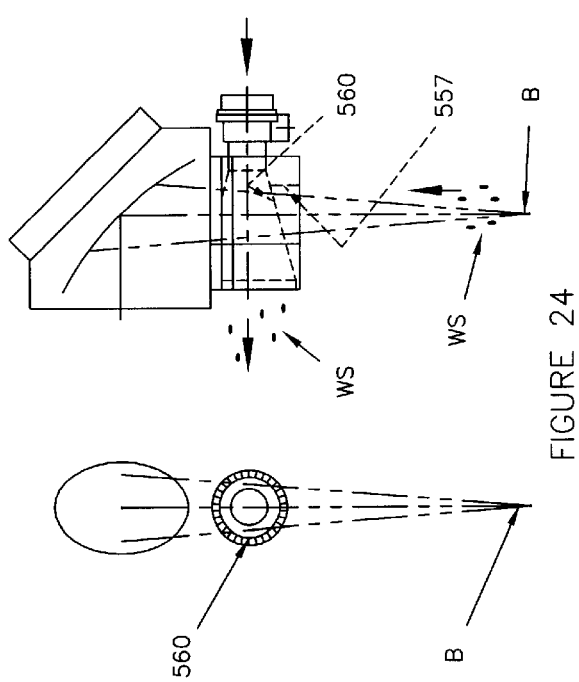

SYSTEM FOR BRINGING THE JOINT EDGES OF SHEET MATERIAL INTO BUTTING RELATIONSHIP FOR WELDING

RELATED APPLICATION

This application is a division of application Ser. No. 08/554,372, filed Nov. 8, 1995, entitled "A Method and Apparatus for Welding," now U.S. Pat. No. 5,814,786.

FIELD OF THE INVENTION

This invention relates generally to welding and particularly to laser welding. It relates more particularly to joining two or more separate pieces of sheet metal along joint edges by laser welding, and specifically to the laser welding of sheet metal pieces having different thicknesses and/or other physical properties.

BACKGROUND OF THE INVENTION

The automotive industry impacts the lives and livelihood of people in the industrialized countries of the world more than any other single industry. The costs of manufacturing and operating automobiles, for example, comprise a significant portion of the cost of living to the average citizen of these countries. Lowering these costs while maintaining or improving quality is a continuing aim of the industry, its customers and their governments.

There are, of course, myriad components and sub-assemblies of the average automobile, for example, each of which is the target of engineers seeking cost savings. One of these is the sheet metal panels which make up the body of the automobile, or components of the body. A method which has recently been found effective in reducing both the costs of manufacturing and operation is the manufacture of body panels using what have come to be known as "tailored" blanks. For example, in the manufacture of inner door panels for automobile doors, a customized or "tailored" blank is formed by welding together two or more pieces of sheet steel which vary in thickness and/or other physical properties.

By nesting many small sheet components together during the blanking or cut-off process, the amount of scrap produced can be drastically reduced. In one known instance, a complex component with five separate pieces laser welded together reduced the scrap produced by 75% over conventional manufacturing techniques wherein the blank is formed in one piece.

In addition, by forming a customized or "tailored" blank from pieces of different thicknesses, different hardness and/or different coatings by laser welding them together along joint edges the final part, after forming in a press, for example, can exhibit certain desired characteristics in one or more areas of the part and other desired characteristics in other areas. To illustrate, it may be desirable to form an inner door panel that has a very deep draw depth to accommodate the contour of the finished vehicle door. This requires a very soft and relatively thin metal. However, the front edge of the same door, where hinges will attach the door to the vehicle, must be strong enough to support the weight of the entire door. Traditionally, this would have required the addition of several parts to a one piece stamping in order to strengthen the front edge. These parts would, of course, require separate blanking, stamping, welding and then attachment to the previously formed, one piece inner door panel.

By producing a tailored blank with a large, thin, soft piece of flat material joined to a thicker, stronger piece of flat material, a customized blank can be formed into a one piece inner door, deeply drawn in one area and very strong in another. This eliminates the necessity of fabricating additional components and attaching them. In addition, substantial savings are realized in scrap reduction and weight reduction, as well as achieving superior dimensional accuracy in the final part. The reduced weight translates into greater fuel efficiency. The increased accuracy translates into improved quality and greater customer satisfaction.

Tailored blanks were first produced in the U.S. as early as 1967, by the A. O. Smith Company. Welding in this early application was accomplished using electron beam technology.

The first significant installation relating specifically to automotive body panels was put into production by Thyseen Stahl AG in Germany in 1985. That installation, which used laser welding technology available at the time, continues in use today.

In North America, laser welding of tailored blanks began and grew slowly in the 1986–1988 period. Armco Steel, Thyssen Stahl AG and DCT-Utilase all had projects underway. Internationally, other than in Germany, Toyota in Japan and Renault in France began limited laser welding operations producing tailored blanks.

From 1989 onward, as significant improvements in laser power and blank edge preparation were made, and as processing experience accumulated, laser welding of tailored blanks became more popular. Littell International, Inc. (VIL) assignee of the present invention and application, was in the forefront although TWB-Thyssen/Worthington and DCT-Utilase were also active. The completion by VIL of a laser welding system for tailored blanks at a General Motors-Canada plant in 1994 was the last major step forward in this technology, i.e., prior to the inventions disclosed in the present application.

It should be pointed out here that many of the more traditional methods of thin material welding, e.g., resistance welding, induction welding and electron beam welding, have also been evaluated or employed in the development of manufacturing techniques for tailored blanks. While each of these techniques has certain advantages related to finished part formability, finished part appearance, processing speed or cost factors, none to date has produced the quality desired at the speed and cost desired.

SUMMARY OF THE INVENTION

A primary object of the present invention is to provide a welding system for welding material together along joint edges.

Another object is to provide a welding system for creating a customized flat blank from thin sheet material components with different thicknesses, different coatings and/or different strengths.

Still another object is to provide a welding system having a sub-system for gauging and clamping sheet material components for the welding operation.

Yet another object is to provide a welding system having a sub-system for bringing joint edges into precise, abutting relationship.

Still another object is to provide a welding system having a sub-system using a laser in welding.

A further object is to provide a method of laser welding thin material components together along joint edges.

The foregoing and other objects are realized in accord with the present invention by providing a laser welding system which incorporates three interrelated sub-systems. A gauging and clamping sub-system positions (i.e., gauges) the joint edges of two sheet material components of the same or varying gauge so that they are substantially parallel to each other in opposed (and coplanar) relationship, and independently clamps each component in this relationship. An edge joint butting sub-system moves one of the components toward the other in the common plane in two stages; a first stage in which the joint edge of one component advances rapidly to within a predetermined distance of the opposing joint edge of the other without any attempt to correct for whatever deviation from a precisely parallel edge relationship might exist, and a second stage in which the joint edge of the one component moves slowly into butting relationship with the opposing joint edge of the other component and, in the process, corrects for any such deviations in parallelism so that the joint edges are precisely butted in alignment with the welding laser beam path. A laser welding sub-system includes a welding torch which projects a laser beam to the joint through a cross-jet air shield. The sub-system moves the beam along the joint by moving the torch to create a uniformly superior weld. The cross-jet air shield creates a barrier against weld spatter reaching and contaminating the optics of the torch. In addition, the sub-system includes a V-shaped barrier which overlies and extends the length of the butting joint edges. The barrier creates two separate zones, above and below each other. A welding environment zone below is separated dynamically from an upper cross-jet zone to provide a welding process which is consistently stable.

The aforementioned and other objects are also realized by providing a method of laser welding which includes an edge conditioning step, a material component entry transfer step, a material component gauging and clamping step, a joint edge butting step, a welding step and an exit transfer step. In the conditioning step, the sheet material component edges are conditioned to achieve substantially full edge face contact. In the transfer step, the components are conveyed to a position under the welding head where the joint edges lie on opposite sides of the beam path. In the gauging and clamping step, the distance from the joint edges to the line of the beam path is gauged and the material components are clamped between lower (fixed) and upper (vertically movable) clamping elements, clamping being effected in segments sequentially outwardly from the mid-point of the joint. In the joint edge butting step, the material components, clamped in the aforedescribed manner, are moved toward each other in their common plane by moving the clamps until the respective joint edges of the components engage each other. The material components are moved toward each other in two stages, the first of which rapidly brings the butt edges to within a predetermined distance of each other along their lengths and the second of which slowly moves the edges into abutting relationship to produce a butted joint. In the welding step, a laser welding head projects a laser beam through an air shield to the joint area and moves the beam the length of the joint.

It is to be understood that both the foregoing general description and the following detailed description are exemplary and explanatory and are intended to provide further explanation of the invention as claimed.

The invention, together with further objects and attendant advantages, will best be understood by reference to the following detailed description of the presently preferred embodiment of the invention, taken in conjunction with the accompanying drawings.

BRIEF DESCRIPTION OF THE DRAWINGS

The present inventions, including the aforedescribed objects and advantages thereof, are illustrated more or less diagrammatically in the drawings, in which:

FIGS. 5A–C are front elevational views of portions of the gauging and clamping sub-system made in accordance with the present invention;

FIG. 14 is an enlarged top plan view of the clamping mechanism shown in FIG. 13, with parts removed;

FIG. 15 is a sectional view taken along line 15—15 of FIG. 14;

FIG. 15A is an enlarged sectional view of a pin and spring of FIG. 15;

FIG. 16 is a sectional view taken along line 16—16 of FIG. 14;

FIG. 17 is an enlarged front elevational view of the laser welding head for the laser welding sub-system made in accordance with the present invention;

FIG. 17A is an enlarged front elevational view of the vertical adjustment screw assembly for the laser welding head made in accordance with the present invention;

FIG. 18 is a side elevational view of the welding head shown in FIG. 17, with the beam focusing device adjustment range and the relationship of the beam to the clamping mechanism shown in phantom lines;

FIG. 19 is a further enlarged side elevational view of a portion of the welding head, showing the welding environment zone containment shield made in accordance with the present invention;

FIG. 20 is a front elevational view of the portion of the welding head and welding environment zone containment shield shown in FIG. 19;

FIG. 21 is an enlarged side elevational view of the air-shield, anti-splatter mechanism made in accordance with the present invention and incorporated in the welding head;

FIG. 22 is a bottom plan view of the mechanism shown in FIG. 21;

FIG. 23 is a sectional view taken along line 23—23 of FIG. 21;

FIG. 24 is a diagrammatic view of the mechanism shown in FIGS. 21–23 in operation.

DESCRIPTION OF THE PREFERRED EMBODIMENT

Figure 1:
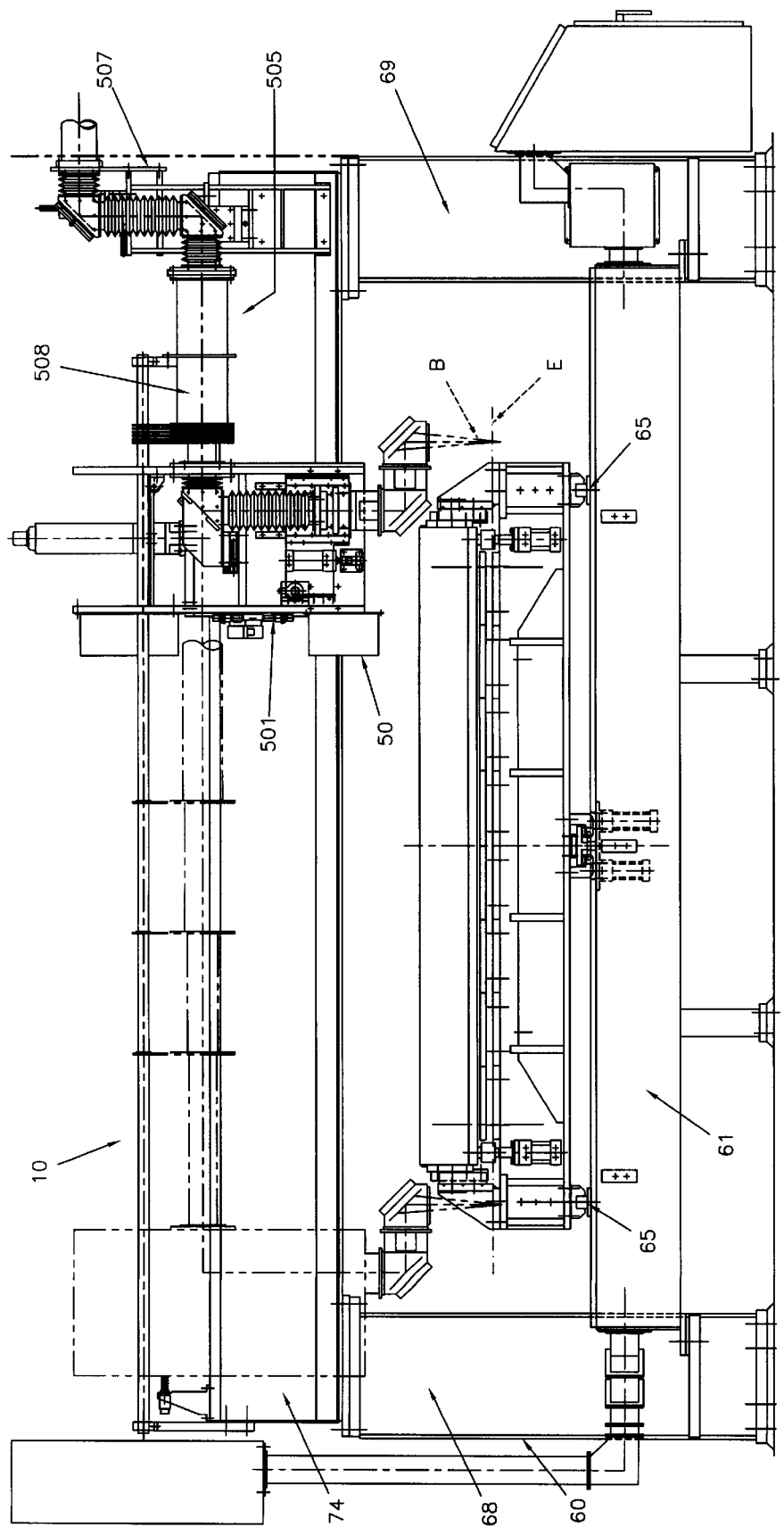
FIG. 1 is a front elevational view of a portion of the laser welding system made in accordance with the present invention, with parts removed for ease of illustration.

Referring now to the drawings, and particularly to FIGS. 1–4, a preferred embodiment of a laser welding system is shown at 10, with various parts removed in different views. The system 10 is preferably designed to receive two thin sheet metal components $C_1$ and $C_2$ (see FIG. 3) which have been sheared so that their opposed edges $E_1$ and $E_2$ are precisely cut, i.e., a precisely mating face contact of at least 60–80% of the thinner component edge is achieved along the length of each edge. It is contemplated that the system 10 could be implemented to receive any desired number of sheet metal components as well as sheet metal components of different thickness and/or physical properties.

The system 10 gauges the components, i.e., preferably bringing the edges $E_1$ and $E_2$ into parallel alignment with each other, and clamps them in this relationship. The system 10 then brings the edges $E_1$ and $E_2$ into butting relationship with each other in a predetermined path. The system 10 then laser welds the components $C_1$ and $C_2$ together along the butting edges $E_1$ and $E_2$ to form a "tailored" blank which may, for example, be formed into an inner door panel for an automobile.

In the preferred embodiment illustrated and described here, the components $C_1$ and $C_2$ are brought to, and taken from, the laser welding system 10 by a conveyor system 20 (see FIGS. 3 and 4) which embodies features of a separate invention.

The laser welding system 10 preferably includes a component gauging and clamping sub-system 30, a component edge butting sub-system 40 and a laser welding sub-system 50. The sub-systems are identified generally, in FIGS. 1–3, relative to the conveyor system 20, and will hereinafter be described in detail by reference to FIGS. 5–24. The sub-systems 30, 40 and 50 are all mounted on a vertically oriented structural steel gantry 60 through which the conveyor system 20 passes.

Figure 3:
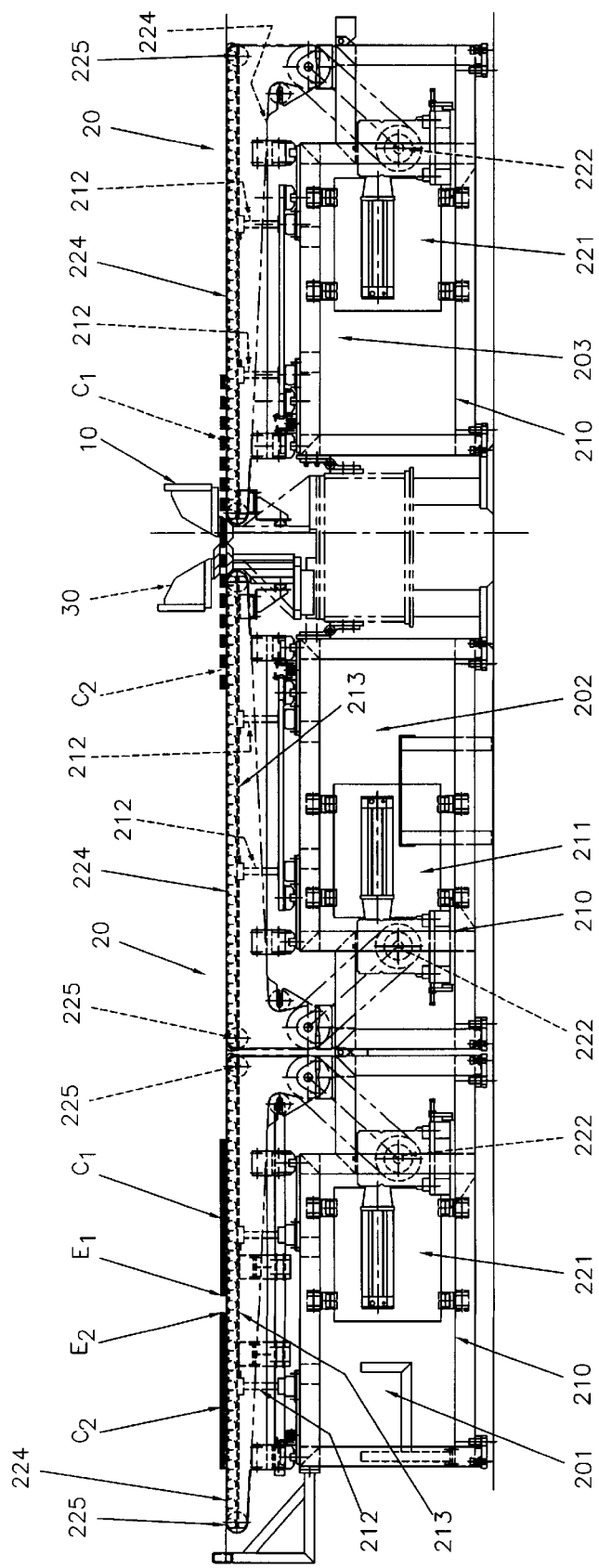
FIG. 3 is a side elevational view of the laser welding system made in accordance with the present invention with the relationship of the entry and exit conveyors to the laser welding sub-system illustrated.
Figure 4:
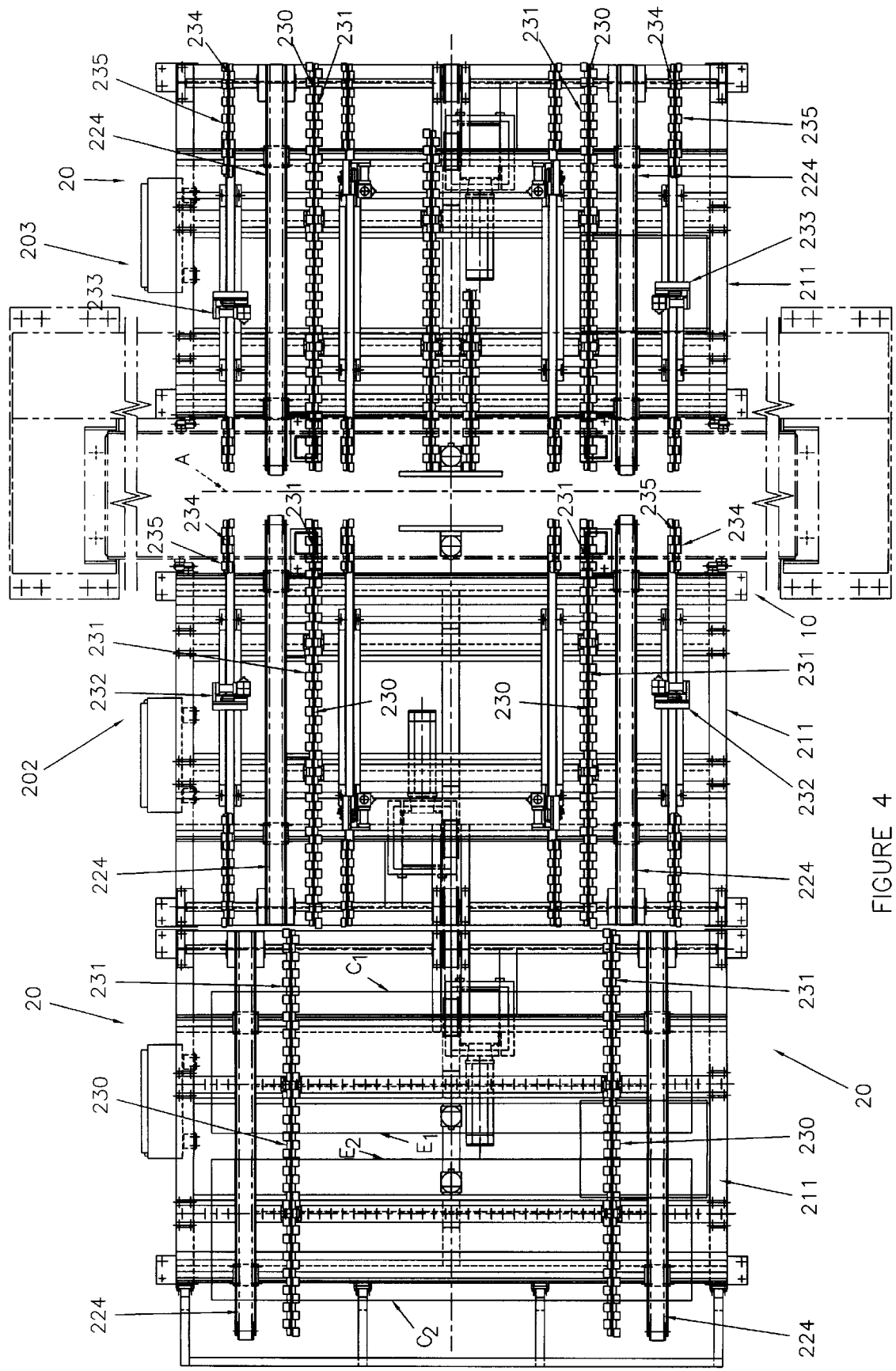
FIG. 4 is a top plan view of the portion of the laser welding system shown in FIG. 3, with parts removed.

The conveyor system 20 is best seen in FIGS. 3 and 4 and includes a component pairing conveyor unit 201, a component entry conveyor unit 202 and a component exit conveyor unit 203. These units are, in many respects, substantially similar. As such, corresponding components will be identified by corresponding reference numerals.

The pairing conveyor unit 201 preferably receives the sheet metal components $C_1$ and $C_2$ either manually or by some mechanical means (e.g., a robot), not shown. The components are deposited on the unit 201 in the position shown in FIGS. 3 and 4.

The conveyor unit 201 conveys the components $C_1$ and $C_2$ onto the entry conveyor unit 202 while maintaining them substantially in the relationship in which they were deposited. The entry conveyor unit 202 continues this conveying function to move the components toward the gauging and clamping sub-system 30, with the component $C_1$ passing through that sub-system 30 onto the exit conveyor unit 203. The conveyor units 201, 202 and 203 preferably have synchronized drives, as will hereinafter be briefly explained. When the components $C_1$ and $C_2$ have reached positions where their edges $E_1$ and $E_2$ bracket the centerline CL of the laser beam (seen in FIG. 3), the conveying function stops. The components $C_1$ and $C_2$ are then in position for gauging and clamping, edge butting and then laser welding, preferably in that order.

The conveyor units 201, 202 and 203 each comprise a four-leg base 210 on which a sub-frame 211 is supported. The sub-frame 211 preferably includes a plurality of support legs 212. The support legs 212, in turn, support roller-transfer sub-assemblies 213.

Each of the conveyor units 201, 202 and 203 incorporates a magnetic belt drive assembly including an electric drive motor 221, a transmission 222 and a pair of magnetic belts 224 connected to the transmission 222 and trained over a series of shaft-mounted pulleys 225. The pulleys 225 are mounted on their respective bases 210. The belts 224 form a surface which supports the components $C_1$ and $C_2$ and to which they are magnetically attracted.

Each roller-transfer sub-assembly 213 includes a plurality of parallel tracks 230 and mounting rollers 231. Each roller transfer sub-assembly 213 may be adjusted so that the uppermost surface of each roller 231 lies in the same horizontal plane as the uppermost surface of adjacent magnetic belts 224.

In addition to the aforedescribed embodiment, the entry conveyor unit 202 and the exit conveyor unit 203 have opposed sheet component $C_1$ and $C_2$ pusher mechanisms 232 and 233 associated therewith. Preferably, the pusher mechanisms comprise a cylinder including a linear bearing having a pin. The pusher mechanisms 232 and 233, which include additional parallel tracks 234 having rollers 235, are used to push the components $C_1$ and $C_2$ toward the gauging and clamping sub-system 30, as well as transversely align them.

Figure 5:
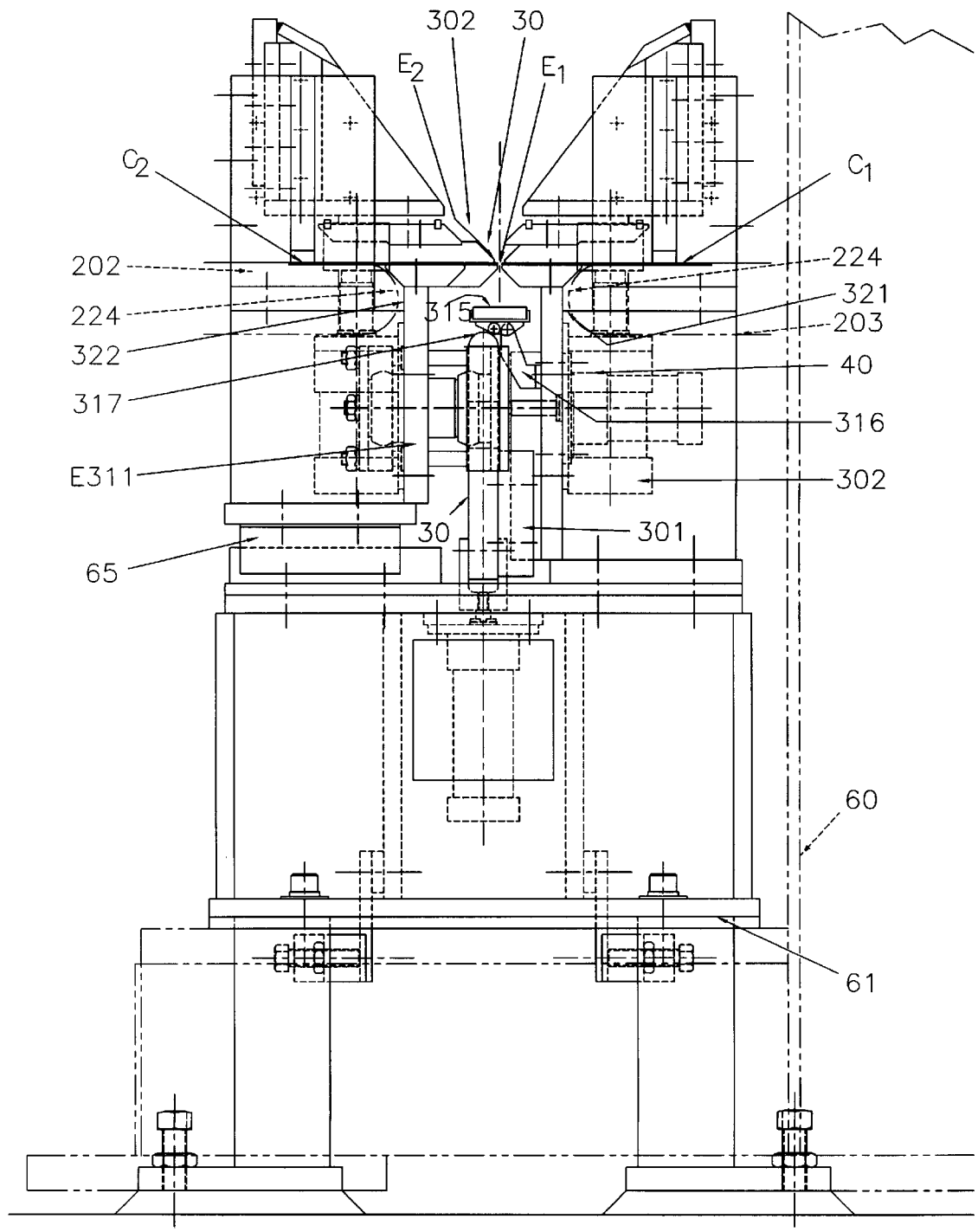
FIG. 5 is a side elevational view of the component gauging and clamping sub-system made in accordance with the present invention.

Turning now to FIGS. 5–16, the gauging and clamping sub-system 30 and the edge butting sub-system 40 are illustrated in detail. FIG. 5 illustrates portions of these sub-systems in a preferred operational relationship to the opposed ends of the magnetic belts 224 on the entry and exit conveyor units 202 and 203.

Still referring to FIG. 5, the gauging and clamping sub-system 30 preferably includes a gauging assembly 301 and a clamping assembly 302, both of which are mounted on the clamp base 61 of the gantry 60. The gauging assembly 301 preferably comprises a transfer bar 317 and plurality of gauging pins 311a and 311b mounted on a rail 319 (see FIGS. 5A, 5B and 5C). The transfer bar 317 has a plurality of slots 309 to engage the pins 311a and 311b along its length. When the components $C_1$ and $C_2$ have been positioned with their opposed butt-edges $E_1$ and $E_2$ precisely aligned with each other and precisely spaced relative to each other, the clamping assembly 302 clamps the components $C_1$ and $C_2$ in this relationship.

Figures 6, 7, 8:
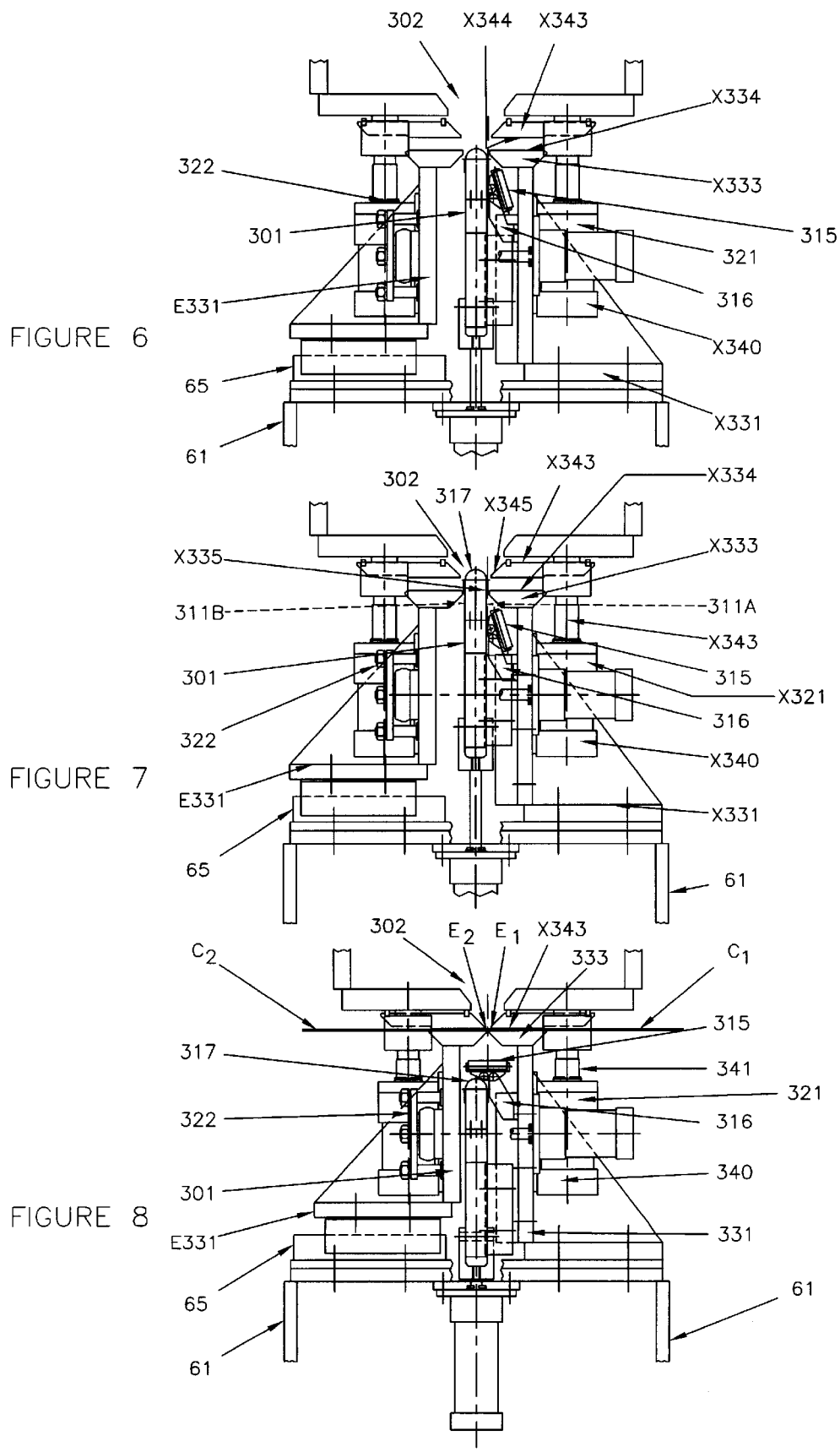
FIGS. 6–8 are enlarged views of the component gauging and clamping sub-system similar to FIG. 5, showing the sub-system successively in its component transfer stage, its gauging and clamping stage and its butting and welding stage.
Figure 9:
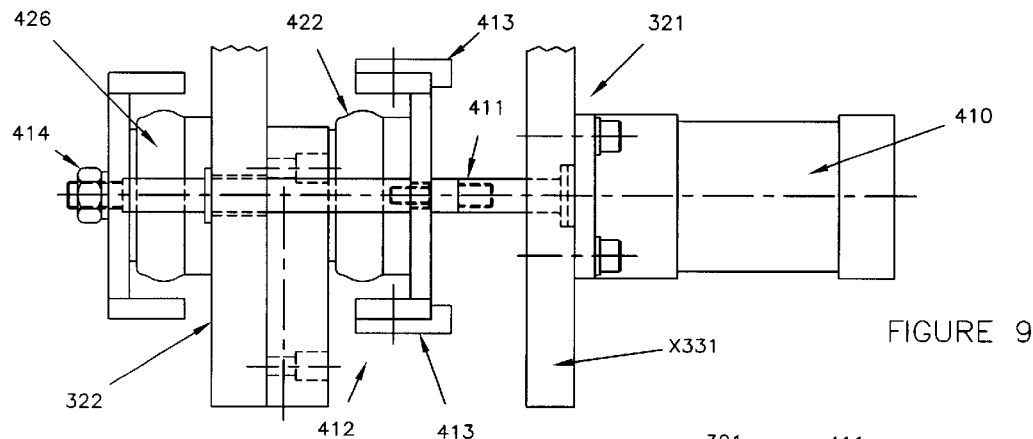
FIG. 9 is a top plan view and FIGS. 10–12 are enlarged side elevational views of the component edge butting mechanism shown actuated in FIG. 8, with the mechanism in various operating stages.
Figure 10:
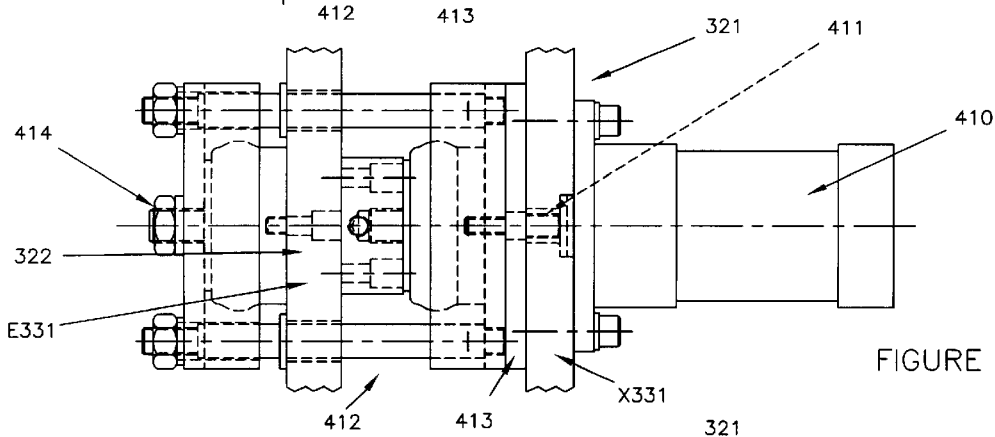
Figure 11:
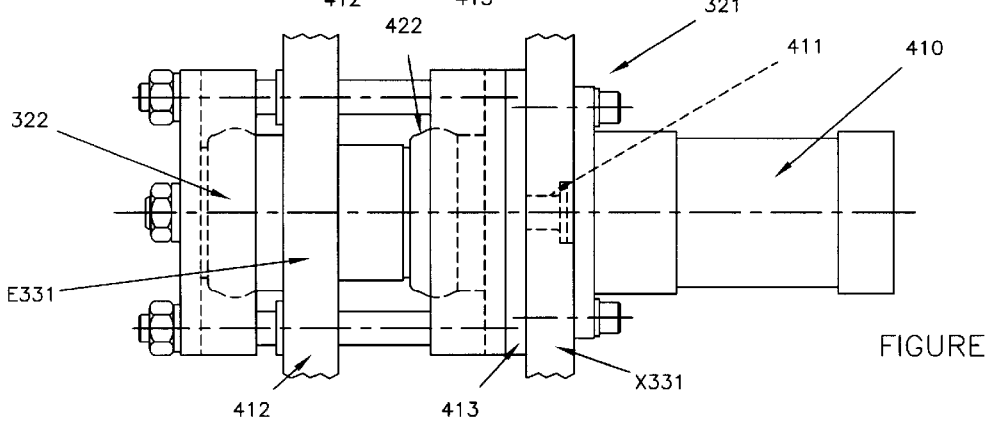
Figure 12:
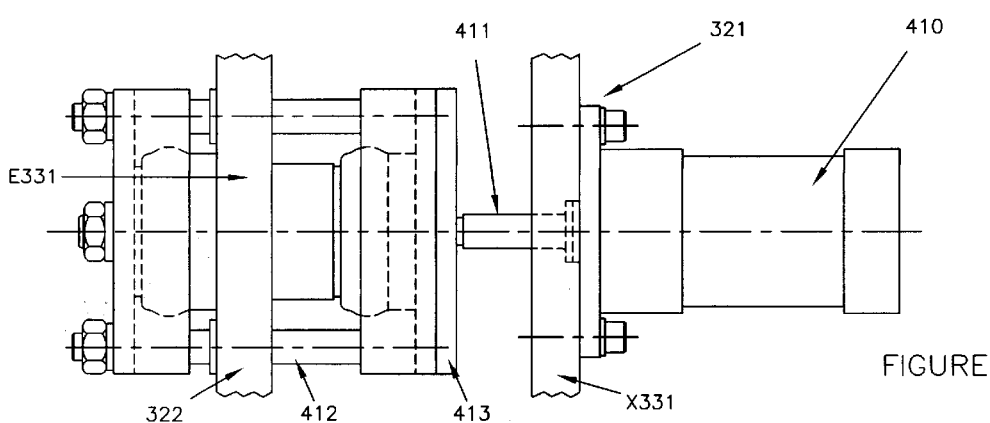
Figure 13:
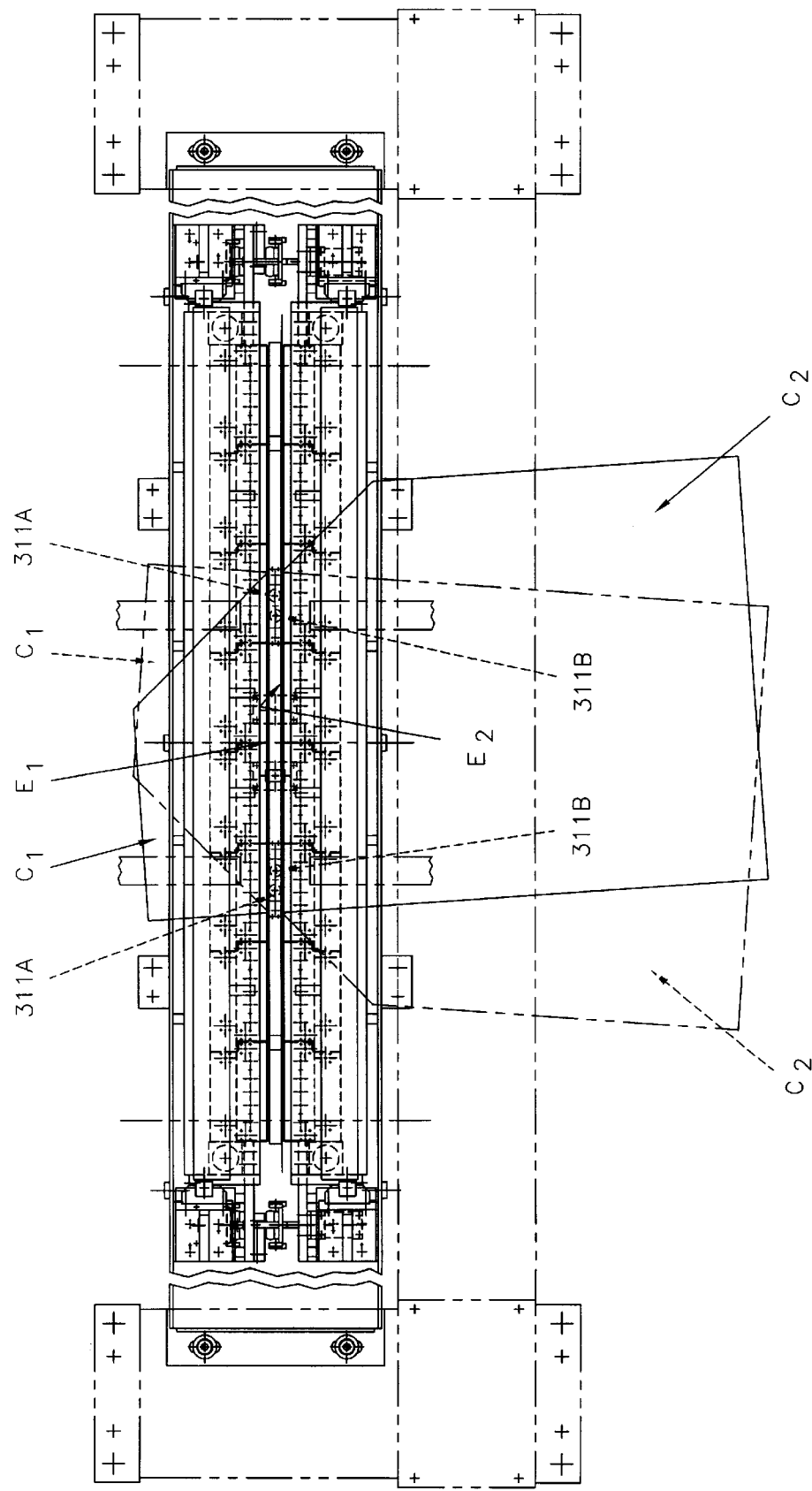
FIG. 13 is a top plan view of the clamping mechanism for the gauging and clamping sub-system, with parts broken away, made in accordance with the present invention.

In FIGS. 5 and 8, the gauging assembly 301 is shown in its retracted position. The clamping assembly 302 has clamped the components $C_1$ and $C_2$ and the edge-butting sub-system 40 has brought the edges $E_1$ and $E_2$ into butting relationship for welding. In the retracted state of the gauging assembly 301, two sets of horizontally spaced gauging pins 311a and 311b are preferably retracted into their lowermost position by fluid motors 312. With the gauging pins 311a and 311b retracted in this manner, an elongated graphite pad 315 is permitted to move downwardly into the position shown to act as an underlying shield for the subsequent welding operation. The pad 315 is mounted on an arm 316 which is preferably spring-loaded, but will pivot upwardly, to cause the pad 315 to move to one side against the spring force, when the gauging assembly 301 moves upwardly. As seen in FIGS. 5A, 5B, and 5C, the gauging pins 311a and 311b can be spaced at various positions to accommodate various sizes of components.

FIG. 6 shows a gauging assembly 301 in its component transfer position. Here the clamping assembly 302 is open to permit component $C_1$ to be moved across the transfer bar 317 of the gauging bar assembly 319. The gauging assembly 301 is driven upwardly into this position by fluid motor 312a (see FIGS. 5A, 5B, and 5C).

FIG. 7 shows the gauging assembly 301 raised to its gauging position, the fully extended position into which it has been driven upwardly by the fluid motor 312b. In the gauging position, the pins 311a and 311b are positioned between edges $E_1$ and $E_2$ of the components $C_1$ and $C_2$. The pusher mechanisms 232 and 233 of the entry and exit conveyor units 202 and 203, respectively, are then actuated to push the components $C_1$ and $C_2$ toward opposite sides of their respective pairs of pins 311a and 311b.

Each pair of pins 311a and 311b comprise sensing probes or low voltage contacts which sense when the opposed component edges $E_1$ and $E_2$ have each contacted its respective pair of pins 311a and 311b, i.e., when each edge has reached a line where it contacts the respective pair of pins. A relay is preferably in communication with the sensing probe. Preferably, the relay has a maximum resistance level for output pick-up of about either 3,000 or 30,000 ohms, or a low maximum resistance level for output pick-up between 10–110 ohms. The sensitive relay may also be a voltage sensitive relay that amplifies a low voltage DC signal by energizing a mechanical output which is capable of switching heavier voltage loads. The voltage sensitive relay may be applied directly to a solid state output of instrumentation or logic controller equipment to function as a power relay.

When the edges $E_1$ and $E_2$ are in contact with the pairs of pins 311a and 311b, the clamping assembly 302 may be actuated to clamp the components $C_1$ and $C_2$ securely with their edges $E_1$ and $E_2$ in this relationship. The pairs of pins 311a and 311b are then retracted so that the edges $E_1$ and $E_2$ can be brought into butting relationship by the edge butting sub-system 40 in a manner hereinafter discussed.

The clamping assembly 302 is best seen in FIGS. 6–8 and 13–16. FIGS. 6–8 show the clamping assembly 302 in end view while FIGS. 13–16 show it, with parts removed, in top plan view (FIGS. 13 and 14) and in sectional view (FIGS. 15 and 16).

Referring first to FIGS. 6–8, the clamping assembly 302 comprises an exit clamping sub-assembly 321 and an entry clamping sub-assembly 322. The exit clamping sub-assembly 321 is mounted on the clamping base 61 of the gantry 60. The entry clamping sub-assembly 322 is mounted on horizontally disposed rails 65 (see also FIG. 1) which, in turn, are fixed on the clamping base 61 so that it can slide toward and away from the exit clamping sub-assembly 321. In the following description of the preferred embodiments, the components of the entry clamping sub-assembly 322 will be identified in the text with the prefix E (for Entry) and the components of the exit clamping sub-assembly 321 will be identified in the text with the prefix X (for EXit).

The exit clamping sub-assembly 321 includes a horizontally elongated body X331 which is generally L-shaped in end view (see FIGS. 6–8). The body X331 is elongated lengthwise of the clamping base 61, between the two vertical columns 68 and 69 which form the opposite ends (or sides) of the welding gantry 60 (see FIG. 1).

As seen in FIGS. 6–8, the L-shaped body X331 has a lower clamping platen X333 mounted on its upper extremity and extending along its length. The platen X333 has a precisely machined, flat upper surface X334 upon which the component $C_1$ is clamped, in a manner hereinafter discussed. Preferably, the upper surface of the platen X333 is sandblasted and coated with chrome. Its leading edge X335 is positioned so that the pair of pins 311a are spaced precisely 0.100 inches from that edge when they are in their gauging position (see FIG. 7).

Mounted on the back of the body X331, in vertically oriented relationship, are two fluid motors X340. Each fluid motor includes an upwardly extending piston X341. Fixed to the upper ends of both pistons X341 is an upper clamping platen X343 which overlies and is coextensive with the lower platen X333.

The platen X343 has a lower surface X344 under which the component $C_1$ is clamped (see FIG. 15 also). Preferably, the lower surface X344 of the platen X343 is sandblasted and coated with chrome. The surface X344 is segmented, in a manner hereinafter discussed. Its leading edge X345 is also positioned so that the pair of pins X311 (seen in FIGS. 5A–5C but partially hidden in FIGS. 6–8) are spaced precisely 0.187 inches from the edge when they are in their gauging position (see FIG. 7).

Referring now to FIGS. 14–16, the upper clamping platen X343 is shown in greater detail. FIGS. 14 and 15 show a top plan view of one-half of the platen X343 and a section through that half. The other half (not shown) is substantially identical in construction and operation.

The platen X343 includes a carrier plate X347 which is mounted, at each of its opposite ends, on the upper end of a piston X341. Preferably, the platen X343 includes a series of eight clamping pads X351, only four of which are shown (under half of the plate X347) are suspended beneath the plate X347. The pads X351, identified as X351a, X351b, X351c, and X351d, are each suspended on four pins X354 which slide vertically in corresponding bores formed through the plate X347.

Preferably, each of the pads X351 is biased or resiliently urged downwardly away from the plate X347 by a series of five coil springs X355 between the pads X351 and the plate X347. The pins X354 have caps X356 on their upper ends which limit the downward travel of the pads, but they are free to move upwardly against the springs X355.

Accordingly to the preferred embodiment, the effective length of the pins X354 associated with each of the pads X351 is slightly different. Preferably, the pins X354 associated with pad X351a are longer than those associated with pad X351b. In turn, the pins X354 associated with the pad X351b are slightly longer than those associated with pad X351c, and so on. The effect is to position the flat, lower clamping surface of each pad, X351a through X351d, 0.04 inches below the preceding pad, from pad X351a outwardly.

With the component $C_1$ in position where its joint edge $E_1$ engages the pins 311a, the fluid motors X340 are actuated to bring the upper clamping platen X343 downwardly. The two center pads X351a (only one shown) on opposite side of the platen centerline CLP engage and clamp the component $C_1$ first. Subsequently, in sequence outwardly from the centerline, the pads X351b, X351c and X351d, engage and clamp. The component $C_1$ is, thus, clamped in proper position for welding without any wrinkling of the edge $E_1$ which might have otherwise been caused by exerting clamping pressure along the entire edge at one time. In other words, the component $C_1$, at its edge $E_1$, is ironed outwardly from the center in order not to trap any waves in the component $C_1$.

The exit clamping sub-assembly 321 has now been described in detail. The entry clamping sub-assembly 322 is substantially similar in construction and operation to the exit clamping sub-assembly 321 (other than being horizontally movable in a manner hereinafter discussed). For example, it includes a horizontally elongated body E331 which is generally L-shaped in end view (see FIGS. 6–8) the details of construction and operation of the platen E443 are not described. Suffice it to say they are substantially identical to the platen X343 and its operation. As such, further description of the entry clamping sub-assembly 322 is unnecessary to a complete understanding of the preferred embodiment. The entry clamping sub-assembly 322 effects clamping of the component $C_2$ with its edge $E_2$ positioned against the gauging pins 311$b$ in precisely the same manner that the exit clamping sub-assembly clamps 321 the component $C_1$. The properly positioned and clamped components $C_1$ and $C_2$ are illustrated as such in FIG. 13.

Once the clamping sub-assemblies 321 and 322 have clamped the components $C_1$ and $C_2$ with their edges $E_1$ and $E_2$ in a desired relationship, the pairs of pins 311$a$ and 311$b$ are drawn downwardly (by the fluid motor 312$a$). This permits the spring-loaded graphite pad 315 to pivot downwardly on its arm 316, into the position shown in FIG. 8. The edge joint butting sub-system 40 is then actuated to bring the edges $E_1$ and $E_2$ into the butting relationship seen in FIG. 8.

The edge joint butting sub-system 40 is best illustrated in FIGS. 2 and 9–12. Referring first to FIGS. 9–12, the sub-system 40 comprises a pair of fluid motors 410 (only one shown), one mounted on each end of the exit clamping sub-assembly 321. Each fluid motor 410 is fixed to the back of the body X331 and extends horizontally rearwardly therefrom.

Extending forwardly from each motor 410, through a suitably formed aperture in the back (or clamp bridge) of the body X331, are motor pistons 411. The motor pistons 411 are preferably connected to the entry clamping sub-assembly 322 through air actuator units 412. As will hereinafter be discussed, in gross operation the actuation of the motors 410 are effective to move the entry clamping sub-assembly 322 toward the exit clamping sub-assembly 321 on the tracks 65 which slidably support the former (see FIG. 10). The effect is to move the component $C_2$ toward the component $C_1$, of course. Preferably, stops 413 on the actuator units 412 engage the body X331 and stop further movement at a point where the components $C_1$ and $C_2$ are spaced 0.010 inches apart.

Preferably, the air actuator units 412 each include an air bladder 422 positioned inside the traveling clamp body E321 and another air bladder 426 positioned outside the clamp body E331. Suitable connections are provided between the bladders 422 and 426 and sources of pressurized air.

To operate the edge butting sub-system 40 according to the preferred embodiment, the motors 410 are actuated to retract the pistons 411 a predetermined distance and bring the entry clamping sub-assembly 322 and, thus, the component $C_2$ toward the exit clamping sub-assembly 321. The distance preferably designed into this system is about 1.375 inches, less about 0.010 inches. In other words, the component edge $E_2$ are brought to within about 0.010 inches of the component edge $E_1$ by travel of the pistons 411 under the control of the motors 410.

During this travel, the air bladder 422 is preferably pressurized with relatively high pressure air (about 30 psi) and the air bladder 426 is preferably pressurized with relatively low pressure air (about 15 psi). When this component $C_2$ movement is complete, the air pressures in the bladders 422 and 426 are reversed. This causes the movable clamp assembly 322 to move and softly butt its component edge $E_2$ against the fixed component edge $E_2$. Because the traveling clamp is mounted on the tracks 65 for limited angular movement relative to those tracks, any slight misalignment of the edge $E_2$ with the edge $E_1$ is accommodated and the edges abut each other snugly along their entire lengths.

The system 10 is now ready to perform its primary function, welding the components $C_1$ and $C_2$ together along their joint edges $E_1$ and $E_2$. FIGS. 1, 2 and 17–24 illustrate the laser welding sub-system 50 which performs this task.

Figure 2:
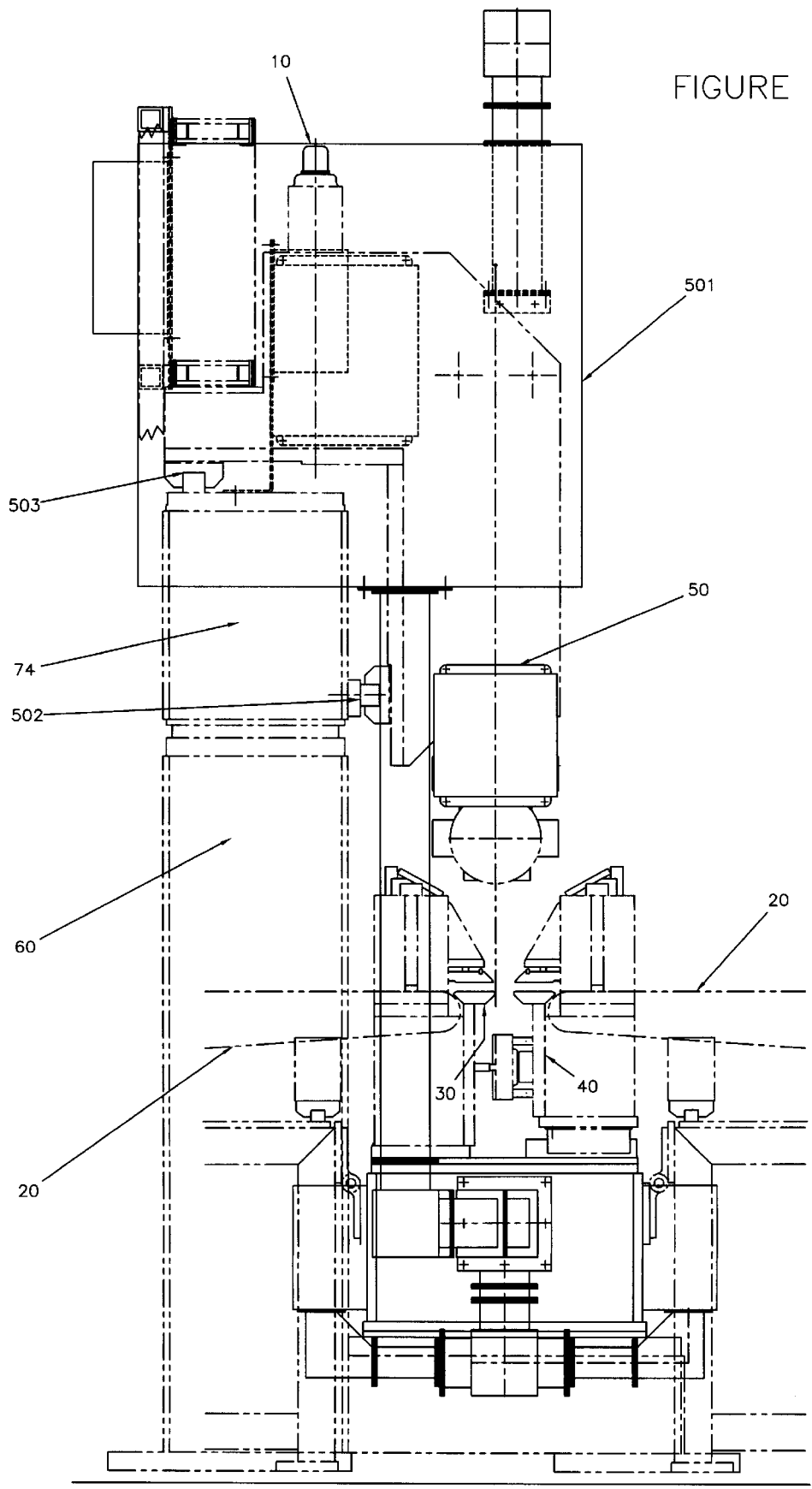
FIG. 2 is a side elevational view of that portion of the laser welding system shown in FIG. 1, also with some parts removed for ease of illustration, but with portions of the entry and exit conveyors shown in phantom lines.

Referring first to FIGS. 1 and 2, the laser welding sub-system 50 preferably comprises a welding carriage 501 mounted for longitudinal travel on the gantry 60. The gantry 60 preferably includes a bridge 74 which is supported on, and secured to, the upper end of each of the columns 68 and 69. The carriage 501 may be slidably mounted on rails 502 and 503 secured to the front surface and top surface of the bridge 74, as best seen in FIG. 2.

The carriage 501 is preferably designed to travel the length of the rails 502 and 503 as it creates a weld joint between the butted joint edges $E_1$ and $E_2$. As seen in FIG. 1, the welding carriage 501 may create this weld joint with a focused laser beam B. The beam B is focused at a point on a line E which is on an imaginary extension of the joint edges $E_1$ and $E_2$. It travels to this focal point in a conventional manner from a resonator (not shown), through a laser beam transmission assembly 505.

The laser beam transmission assembly 505 preferably comprises a periscope sub-assembly 507 and a telescope sub-assembly 508. The periscope sub-assembly 507 receives the laser beam from the resonator and, through a series of mirrors (not shown), redirects it into, and along the axis of, the telescope sub-assembly 508, all in a well-known manner.

As the welding carriage 501 is moved along the bridge 74 in its welding operation, the telescope sub-assembly 508 extends to follow it, as seen in dotted lines in FIG. 1. When the carriage 501 is retracted, the telescope sub-assembly 508 collapses, i.e., telescopes into itself, in a well-known manner.

Referring now to FIGS. 17 and 18, the welding carriage 501 preferably comprises a pair of vertical side-frames 510 and 511. The side-frames 510 and 511 are joined by cross-member plates 513 and 514 to form the superstructure for the carriage 501. Preferably, the plate 513 has a bottom mounted guide 516 on it which seats in sliding relationship on the rail 503. The plate 514 may also include a side mounted guide 517 which seats in sliding relationship on the rail 502.

Within the superstructure forming plates 513 and 514 is mounted the welding head sub-assembly 520. The welding head sub-assembly 520 preferably includes a flying mirror assembly 523, an accordion-like vertical beam transmission housing 524 and a welding beam torch 525.

As seen in FIG. 20, the torch 525 preferably comprises a generally L-shaped, tubular body 530. The body 530 has a vertically oriented cylindrical head 531, a right-angle mid-section 532 and a horizontally oriented cylindrical foot 533. It is from the base 534 of the foot 533 that the laser beam B is directed at the butted joint edges $E_1$ and $E_2$ of the sheet components $C_1$ and $C_2$.

It should be noted here that FIGS. 17 and 18 show the carriage 501 without its air shield unit 540 (see FIGS. 19 and 20). For ease of explanation, however, the carriage 501 is first described with reference to FIGS. 17 and 18 without the air shield unit 540.

The head 531 of the torch 525 is preferably fastened to the lower end of the housing 524 for rotational movement around the vertical axis of that housing 524. It is mounted in a conventional annular bearing arrangement 542 affixed to a vertical mounting plate 543. The plate 543 is, in turn, preferably mounted for vertical, sliding movement on a back plate 544 in the carriage 501.

The torch 525 may be adjusted vertically so as to move the beam B up and down to set the focal point position. This is effected through a vertical adjustment screw assembly 545 (see FIG. 17A).

By the same token, the head 531 may be rotated in the bearing arrangement 542. This rotation causes the beam B to move from side-to-side in an arc, as will be recognized. Preferably, the head 531 also has one other movement capability. Preferably, the foot 533 can be rotated about its own axis. This is accomplished by mounting the foot 533 in a bearing ring 549 and permitting it to be rotated in that ring by manual adjustment. It is contemplated that the movement of the head 531 and foot 533 may be effected by motors M.

It should be recognized that the details of construction and operation of the torch 525 are, in general, not features of the inventions. That is not true of the air shield unit 540, however, which will subsequently be described in detail in relation to the torch 525.

Turning now to FIGS. 19 and 20, the air shield unit 540 is shown fastened to the base 534 of the foot 533. The laser beam B passes through it in focusing on the butted joint edges $E_1$ and $E_2$. Excited ambient air flowing horizontally through the unit 540 provides a shield against weld splatter reaching the optics of the system. This will be subsequently described in detail.

Below the air shield unit 540 is a generally V-shaped plate 550 which forms a welding zone containment shield between the weld joint and the torch 525. The plate 550 has an aperture 551 formed through the base 552 of the plate on the beam B path so as to permit the beam to pass.

The air shield unit 540 is shown in greater detail in FIGS. 21–24. It preferably includes a manifold 555 which is fastened to the base of the foot 533 with four bolts 556. The manifold 555 has a cylindrical passage or orifice 557 extending vertically through it, into communication with the foot 533 of the torch 525. The laser beam B passes through the orifice 557 to the butted joint edges $E_1$ and $E_2$ (see FIG. 24).

The manifold 555 preferably has a conical-shaped horizontal passage 560 extending through it normal to the orifice 557. As its smaller end, the passage 560 is connected to an air inlet fitting 561 or transvector. The fitting 561 is fastened to the manifold 555 with two bolts 562.

Figure 25:
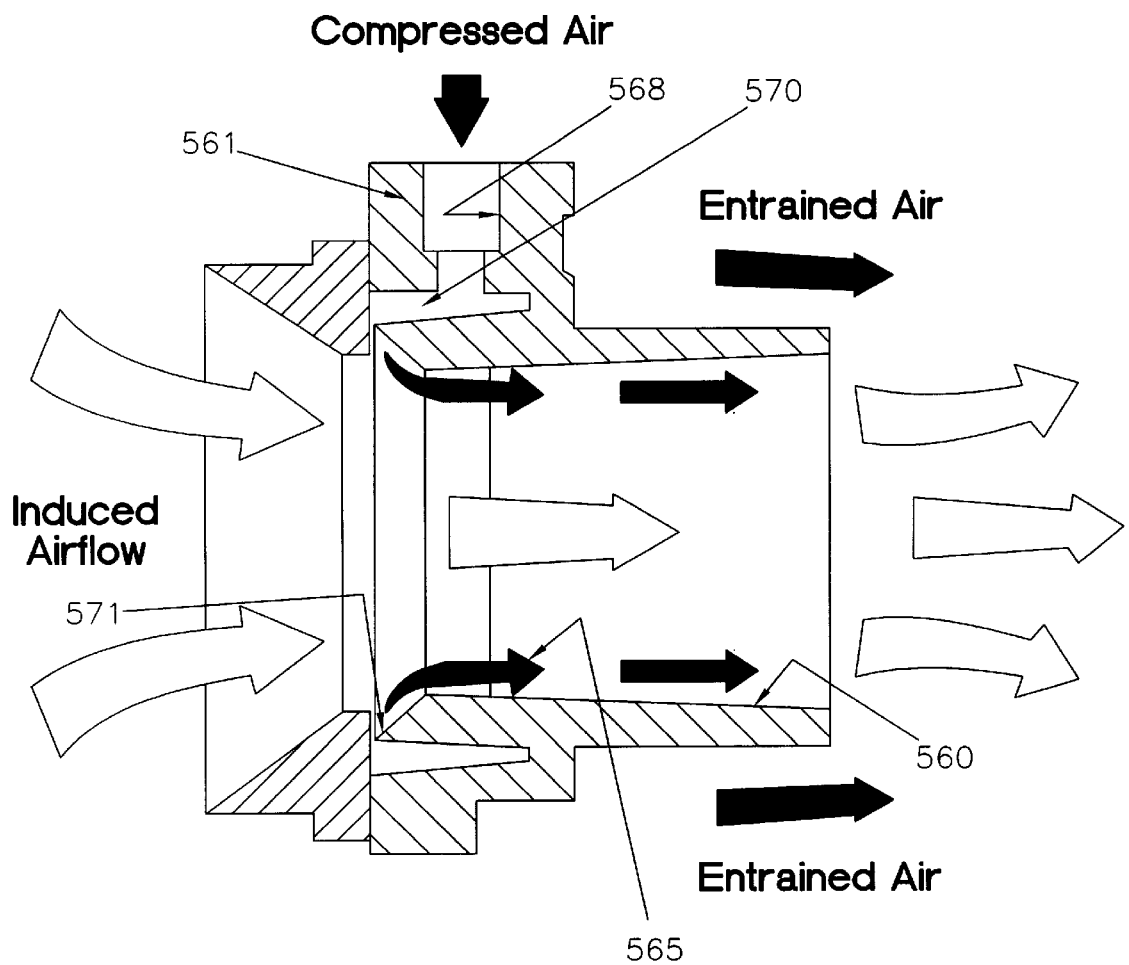
FIG. 25 is a cross-sectional view of the air shield made in accordance with the present invention.

The fitting 561 has a venturi-like passage 565 through it, in communication with the conical passage 560 in the manifold 555. At the narrowest point in the venturi-like passage 565, a vertically oriented air-inlet port 568 is formed. Compressed air from a suitable source is used to accelerate the stationary air within the fitting 561. When compressed air enters the fitting 561, it fills a chamber that has only one exit path. As air passes through the exit path at an accelerated rate, it is deflected down the throat of the fitting 561, colliding with the surrounding air and accelerating free air toward the outlet (see FIG. 25 for a diagrammatic illustration).

The airflow through the passage 560 creates an air barrier in the passage. The laser beam passes downwardly through it without being disturbed. However, any weld splatter WS which flies upwardly is swept aside by the air flow and does not reach the laser welding optics (see FIG. 24).

The generally V-shaped plate 550 is preferably fastened to and moves with the welding head (see FIGS. 19 and 20). According to the preferred embodiment, it isolates the welding area from the welding head by substantially confining the welding area between the base 552 of the plate 550 and the leveled noses of the exit and entry upper clamping platens X343 and E343. A helium rich atmosphere created in a conventional way (see the helium nozzles 553) around the weld joint as it is formed is generally confined to the weld joint area in this manner.

Although the present invention has been described in detail by way of illustration and example, it should be understood that a wide range of chances and modifications can be made to the preferred embodiment described above without departing in any way from the scope and spirit of the invention. For example, although the preferred embodiment shows only two components, the preferred embodiment may weld a number of pieces together. Thus, the described embodiment is to be considered in all respects only as illustrative and not restrictive, and the scope of the invention is, therefore, indicated by the appended claims rather than the foregoing description. All changes that come within the meaning and range of equivalency of the claims are to be embraced within their scope.

We claim:

1. In a system for welding a first sheet metal component to a second sheet metal component, an edge butting sub-system for butting a joint edge of said first sheet metal component against a joint edge of said second sheet metal component, comprising:
   a) a clamping assembly;
   b) said clamping assembly including a first clamping sub-assembly for clamping said first sheet metal component and a second clamping sub-assembly for clamping said second sheet metal component, both of said clamping sub-assemblies being mounted on a base;
   c) said second clamping sub-assembly being mounted on said base for travel toward and away from said first clamping sub-assembly whereby the joint edges of the sheet metal components can be brought into butting relationship with each other;
   d) a motor connected to said second clamping sub-assembly and being operable to move said second clamping sub-assembly toward said first clamping sub-assembly;
   e) said motor including a driven element connected to said second clamping sub-assembly through a connection which permits relative movement between said driven element and said one clamping sub-assembly;
   f) said connection including an expandable fluid chamber, the introduction of fluid under pressure to said chamber at a predetermined pressure being effective to move said second clamping assembly toward said first clamping assembly.

2. The edge butting sub-system of claim 1 further characterized in that:
   a) said second clamping sub-assembly includes a clamp body;
   b) said driven element being connected to said clamp body through a first expandable fluid chamber and a second expandable fluid chamber whereby the position of said clamp body relative to said driven element can be varied by varying the fluid pressure in said expandable chambers.

3. The edge butting sub-system of claim 2 further characterized in that:

a) said expandable chambers include an inner chamber connecting said driven element to one side of said clamp body and an outer chamber connecting said driven element to the other side of said clamp body.

4. The edge butting sub-system of claim 3 further characterized in that:

a) each of said chambers comprises a bladder.

5. The edge butting sub-system of claim 4 further characterized by and including:

a) a source of air under a predetermined lower pressure and a source of air under a predetermined higher pressure; and b) an air control for directing air under the lower pressure to the outer bladder and air under higher pressure to the inner bladder or, alternatively, air under lower pressure to the inner bladder and air under higher pressure to the outer bladder.

6. A system for butting a joint edge of a first sheet component against a joint edge of a second sheet component, comprising:

a) a clamping assembly mounted on a base and including a first clamping sub-assembly for clamping said first sheet component and a second clamping sub-assembly for clamping said second sheet component;

b) said second clamping sub-assembly being mounted on said base for travel toward and away from said first clamping sub-assembly whereby the joint edges of the sheet components can be brought into butting relationship with each other;

c) a fluid motor including a cylinder with a piston movable therein;

d) said fluid motor cylinder being mounted on one of said clamping sub-assemblies;

e) said piston being connected to the other clamping sub-assembly; and f) an air actuator unit in the connection between said piston and said other clamping assembly, said air actuator unit including at least one inflatable element.

7. The system of claim 6 further characterized in that:

a) said other clamping sub-assembly includes a clamp body;

b) said air actuator unit includes at least two inflatable elements with one inflatable element on each side of said clamp body.

8. The system of claim 7 further characterized by and including:

a) a source of air under pressure; and b) a switching device for alternately directing higher pressure air to one inflatable element and lower pressure air to the other inflatable element.

9. The system of claim 7 further characterized in that:

a) said inflatable elements comprise bladders.

10. The system of claim 7 further characterized by and including:

a) means for causing said bladders to expand and contract.

11. The system of claim 8 further characterized in that:

a) said higher pressure air is at approximately 30 psi and said lower pressure air is at approximately 15 psi.

12. The edge butting sub-system of claim 5 further characterized by and including:

a) a stop member on said connection for limiting the amount of movement of said second clamping sub-assembly toward said first clamping sub-assembly under the influence of said driven element;

b) said second clamping sub-assembly being movable further toward said first clamping sub-assembly by inflating one of said bladders.

13. In a system for welding a first sheet metal component to a second sheet metal component, an edge butting sub-system for butting a joint edge of said first sheet metal component against a joint edge of said second sheet metal component, comprising:

a) a clamping assembly;

b) said clamping assembly including a first clamping sub-assembly for clamping said first sheet metal component and a second clamping sub-assembly for clamping said second sheet metal component, both of said clamping sub-assemblies being mounted on a base;

c) at least one of said sub-assemblies being mounted on said base for travel toward and away from the other of said clamping sub-assemblies whereby the joint edges of the sheet metal components can be brought into butting relationship with each other;

d) said one clamping sub-assembly being mounted on said base in a manner which permits it to change its angular relationship relative to the other clamping sub-assembly in the plane of the sheet metal components as it moves toward the other clamping sub-assembly;

e) a fluid motor including a cylinder mounted on one of said clamping sub-assemblies and a piston connected to the other of said clamping sub-assemblies;

f) said piston being connected to said other clamping sub-assembly through an air actuator unit;

g) said other clamping sub-assembly including a clamp body;

h) said air actuator unit including at least two inflatable elements with one inflatable element on each side of said clamp body.

14. The edge butting sub-system of claim 13 further characterized in that:

a) said one clamping sub-assembly is mounted on said base in a manner which permits it to change its angular relationship relative to the other clamping sub-assembly as it moves toward the other.

* * * * *